Patented Nov. 21, 1922.

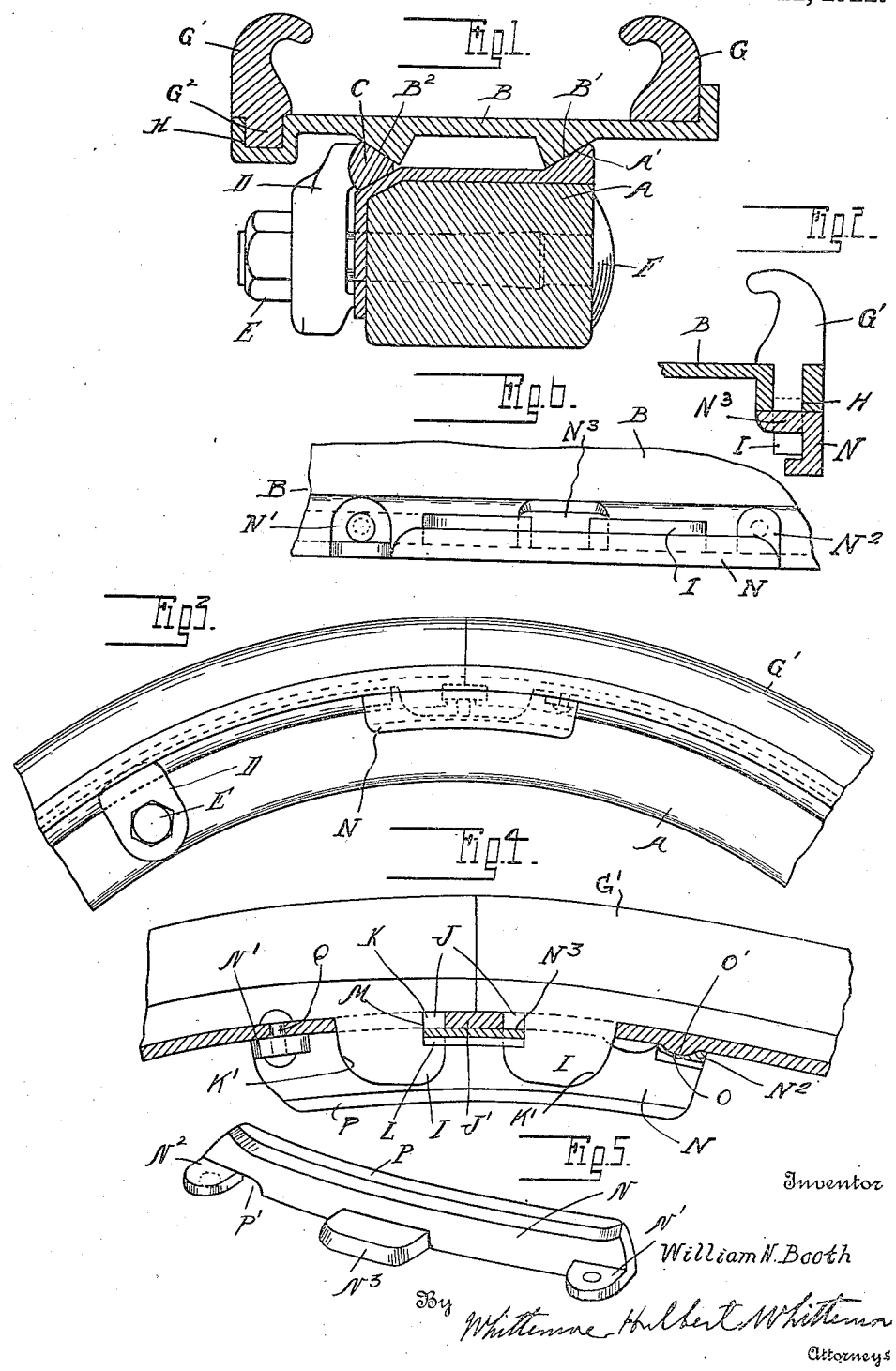

1,436,336

UNITED STATES PATENT OFFICE.

WILLIAM N. BOOTH, OF DETROIT, MICHIGAN.

DEMOUNTABLE RIM.

Original application filed August 16, 1916, Serial No. 115,347. Divided and this application filed September 13, 1916. Serial No. 119,969.

*To all whom it may concern:*

Be it known that I, WILLIAM N. BOOTH, a citizen of the United States of America, residing at Detroit, in the county of Wayne and State of Michigan, have invented certain new and useful Improvements in Demountable Rims, of which the following is a specification, reference being had therein to the accompanying drawings.

The invention relates to automobile wheel rims particularly of the demountable type, and the object of the invention is to obtain an improved construction for detachably securing a split tire holding ring to the rim. Another object is to secure a construction which is simple and easy to operate, and in which the ring may be easily assembled upon the rim; and further to obtain various advantages as hereinafter set forth.

In the drawings:

Figure 1 is a transverse section through the complete rim of an automobile wheel;

Figure 2 is a transverse section of the edge of the rim showing the clasp or plate for holding the tire holding ring upon the rim;

Figure 3 is a side elevation of a portion of the complete rim showing the clasp or plate for securing the ring upon the rim;

Figure 4 is an enlarged circumferential section showing the engagement of the clasp or plate with the extremities of the tire holding ring;

Figure 5 is a perspective view of the clasp or plate detached from the rim; and

Figure 6 is a plan view of the inner face of the rim showing the clasp or plate for holding the tire holding ring in place.

The subject matter in the present application was originally disclosed in my earlier application, Serial No. 737,954, filed Dec. 21, 1912, which was formally allowed, lapsed and renewed under Serial No. 115,347, filed August 16, 1916, and the present application is a divisional thereof.

A represents the felloe rim upon which is mounted the demountable rim B, the latter being secured thereto by means of the cooperating inclined shoulders A' and B' respectively upon the felloe rim and demountable rims and the inclined shoulders B² upon the demountable rim engaged by the wedge ring C which is held in place by the clamping plate D secured to the felloe rim by means of the nut E threadedly engaging the bolt F passing therethrough. Mounted upon one edge of the demountable rim is the tire holding ring G engaging one side of the tire and detachably engaging the demountable rim B. At the opposite edge thereof is the split ring G' having an annular portion G engaging the annular groove or channel H in the demountable rim B and having inwardly extending members I engaging adjacent apertures J in the detachable rim separated by an integral intermediate portion thereof J'. The inwardly extending members I are at the extremities of the split ring and are cut-away at K to form a shoulder portion L and a neck portion M.

For the purpose of clamping and holding the split tire holding ring G' in position upon the demountable rim B there is provided the clasp or plate N having laterally projecting lugs or ears N' and N² at opposite ends and an intermediate laterally projecting wedge-shaped lug or ear N³. The clasp or plate is pivotally secured to the inner side of the demountable rim by the pivot Q passing through the rim and the lug N' of the clasp or plate and is adapted to pass underneath the rim, the wedge-shaped lug or ear N³ adapted to pass into the opening between the inwardly extending members I of the split tire holding rim and against the shoulders L to close tightly the extremities of the ring. The clasp or plate is also provided with an overhanging edge P for protecting the parts from injury and further with a recess P' in one edge thereof into which a tool may be inserted for releasing the same.

To prevent the escape of the inwardly extending members I there is provided the projection O' upon the demountable rim B adapted to engage the recess O in the inner face of the lug or ear N² of the clasp or plate N, when the latter is in closed position, the engagement being resilient due to the spring action of the clasp or plate.

This device may be quickly operated and is efficient and simple in construction and by its means the tire holding ring can be easily and rapidly attached to and detached from the demountable rim, there being no outwardly extending shoulders to interfere.

What I claim as my invention is:

1. The combination with a rim having an annular groove near one edge thereof, and adjacent openings with an integral intermediate portion, of a split tire holding ring having a portion adapted to enter said groove, and inwardly extending members at its ends adapted to pass through said openings, each of said inwardly extending members having a neck portion and a shoulder portion, and a clasp or plate pivoted upon said rim and having a wedge shaped member adapted to enter the opening between said inwardly extending members on the tire holding ring and to engage said shoulders.

2. The combination with a demountable rim having an annular groove near one edge thereof and adjacent openings with an integral intermediate portion, of a split tire holding ring having a portion adapted to enter said groove, and inwardly extending members at its ends adapted to pass through said openings, each of said inwardly extending members having a neck portion and a shoulder portion, and a clasp or plate pivoted upon said rim and having a wedge shaped member adapted to enter the opening between the inwardly extending members on said tire holding ring and to engage said shoulders, and means for resiliently retaining said clasp or plate in position.

3. The combination with a rim having an annular groove near one edge thereof, and adjacent openings with an integral intermediate portion, of a split tire holding ring having a portion adapted to enter said groove, and inwardly extending members at its ends adapted to pass through said openings, each of said inwardly extending members having a neck portion and a shoulder portion, and a clasp or plate pivoted upon said rim and having a wedge shaped member adapted to enter the opening between said inwardly extending members on the tire holding ring and to engage said shoulders, and a recess in the face adjacent to said rim, said rim having a projection adapted to engage said recess when the said clasp or plate is in closed position.

In testimony whereof I affix my signature.

WILLIAM N. BOOTH.